(12) United States Patent
Ookouchi et al.

(10) Patent No.: US 9,242,445 B2
(45) Date of Patent: Jan. 26, 2016

(54) METHOD FOR PRODUCING BONDED BODY

(71) Applicant: DENSO CORPORATION, Kariya, Aichi-pref. (JP)

(72) Inventors: Yasuyuki Ookouchi, Toyota (JP); Yasunori Kawamoto, Toyota (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 14/231,829

(22) Filed: Apr. 1, 2014

(65) Prior Publication Data

US 2014/0290852 A1    Oct. 2, 2014

(30) Foreign Application Priority Data

Apr. 1, 2013 (JP) .................................. 2013-075641

(51) Int. Cl.
| | |
|---|---|
| *B23K 20/00* | (2006.01) |
| *B32B 37/14* | (2006.01) |
| *C04B 37/02* | (2006.01) |
| *B32B 37/26* | (2006.01) |
| *B01D 46/00* | (2006.01) |

(Continued)

(52) U.S. Cl.
CPC ................ *B32B 37/14* (2013.01); *B01D 46/00* (2013.01); *B32B 9/041* (2013.01); *B32B 37/26* (2013.01); *C04B 37/023* (2013.01); *C04B 37/026* (2013.01); *C04B 38/0006* (2013.01); *B23K 20/02* (2013.01); *B32B 2307/302* (2013.01); *B32B 2311/00* (2013.01); *B32B 2315/02* (2013.01); *C04B 2235/9607* (2013.01); *C04B 2237/122* (2013.01); *C04B 2237/365* (2013.01); *C04B 2237/408* (2013.01); *C04B 2237/50* (2013.01); *C04B 2237/60* (2013.01); *C04B 2237/708* (2013.01); *C04B 2237/72* (2013.01)

(58) Field of Classification Search
CPC ...... C04B 37/023; C04B 37/026; B23K 20/02
USPC ............. 228/193, 194, 122.1, 124.1; 156/155
See application file for complete search history.

(56) References Cited

U.S. PATENT DOCUMENTS

| | | | | |
|---|---|---|---|---|
| 4,624,403 A | * | 11/1986 | Kohno ................... | C04B 35/645 228/124.1 |
| 2005/0271891 A1 | | 12/2005 | Kuzuoka et al. | |

(Continued)

FOREIGN PATENT DOCUMENTS

| | | |
|---|---|---|
| JP | A-07-300375 | 11/1995 |
| JP | A-2005-343768 | 12/2005 |

(Continued)

*Primary Examiner* — Scott W Dodds
(74) *Attorney, Agent, or Firm* — Oliff PLC

(57) ABSTRACT

A method for producing a bonded body of ceramic and metal bodies includes stacking a ceramic body, metal body, gap layer capable of preventing oxidation and hindering heat conduction, first intermediate layer and second intermediate layer with the gap layer between the ceramic body and the metal body in the stacking direction. The first intermediate layer is between the ceramic body and gap layer, and the second intermediate layer is between the gap layer and metal body, linear expansion coefficients of the first and second intermediate layers being between those of the ceramic body and the metal body. Diffusion bonding is performed between the ceramic body and the first intermediate layer, and between the metal body and the second intermediate layer simultaneously. The gap layer is then removed from between the first and second intermediate layers. The first and second intermediate layers are then bonded to each other.

6 Claims, 6 Drawing Sheets

(51) Int. Cl.
  *C04B 38/00* (2006.01)
  *B32B 9/04* (2006.01)
  *B23K 20/02* (2006.01)

(56) References Cited

U.S. PATENT DOCUMENTS

2008/0199709 A1  8/2008  Ishiwata et al.
2008/0304959 A1  12/2008  Benoit et al.
2013/0216842 A1  8/2013  Kawamoto et al.

FOREIGN PATENT DOCUMENTS

| JP | A-2008-202092 | 9/2008 |
| JP | A-2009-518270 | 5/2009 |
| JP | A-2012-076937 | 4/2012 |
| JP | 2013-170090 A | 9/2013 |

* cited by examiner

METHOD FOR PRODUCING BONDED BODY

CROSS-REFERENCE TO RELATED APPLICATION

This application is based on and claims the benefit of priority from earlier Japanese Patent Application No. 2013-75641 filed Apr. 1, 2013, the description of which is incorporated herein by reference.

BACKGROUND

1. Technical Field

The invention relates to a method for producing a bonded body by using diffusion bonding.

2. Related Art

A bonded body of a ceramic body made from a ceramic material and a metal body made from a metal material is used in, for example, an electrically heated catalytic converter (EHC), a temperature sensor element and a ceramic heater etc.

In such a bonded body, the ceramic body and the metal body are bonded to each other using various bonding methods.

For example, Patent document 1 (Japanese patent application publication No. 2012-76937) discloses a bonded body made by brazing the ceramic body and the metal body with a brazing material therebetween. However, since the brazing material has a comparatively low melting point, when the bonded body is used under a high temperature environment such as inside an exhaust pipe of the a vehicle, creep resistance of the brazing material becomes a problem, and the allowable working temperature of the bonded body is limited.

Patent document 2 (Patent application publication No. 2005-343768) discloses a bonded body made by heating the ceramic body and the metal body to perform diffusion bonding. This method allows diffusion layers at the interfaces of the ceramic body and the metal body to form, which causes bond portions of both bodies to have higher melting points. Accordingly, when the bonded body is used under high temperature environment, heat resistance can be secured adequately.

If diffusion bonding between the ceramic body and the metal body is performed simply, however, there is the following problem.

That is, a thermal expansion coefficient of a ceramic material composing a ceramic body is generally smaller than that of a metal material composing a metal body. Accordingly, if the bonded body is used under a high temperature environment, heat stress (tensile stress) due to the difference between the heat expansion coefficients of the metal body and the ceramic body occurs in the ceramic body, this might cause damage such as cracks to occur in the ceramic body or the bond portions of both bodies.

For solving this problem, the following method is possible. That is, between the ceramic body and the metal body, an intermediate layer whose thermal expansion coefficient is between those of the ceramic body and the metal body is provided, thereby decreasing the heat stress due to the difference between the ceramic body and the metal body. Diffusion temperatures, however, might be different between diffusion bonding of the ceramic body and the intermediate layer and diffusion bonding of the metal body and the intermediate layer. In this case, keeping each bond portion at a respective diffusion temperature is needed.

SUMMARY

The present disclosure provides a method for producing a bonded body, securing bonding reliability adequately and increasing work efficiency for bonding.

An exemplary embodiment provides a method for producing a bonded body having a first diffusion bonding site and a second diffusion bonding site where diffusion bonding is performed at different diffusion bonding temperatures. The method has the steps of stacking a gap layer, diffusion bonding, removing the gap layer and bonding. In the step of the stacking the gap layer, the gap layer is stacked between the first and second diffusion bonding sites to form a stacked body. In the step of diffusion bonding, at least diffusion bonding in at least the first diffusion bonding site is performed in the stacked state, the gap layer reducing heat conduction between the first and second diffusion bonding sites. In the step of removing the gap layer, the gap layer is removed, and the adjacent surfaces to the gap layer are contacted with each other, keeping the stacked state. In the step of bonding, the contacted surfaces are bonded in the stacked state.

The gap layer may have further function of preventing the adjacent surfaces from being oxidized, or may have only heat insulating function.

Diffusion bonding in the second diffusion bonding site may be performed at the same time as diffusion bonding in the first diffusion bonding site, at the step of bonding the contacted surfaces, or after those. It is preferred that bonding temperature after diffusion bonding in the first diffusion bonding site is smaller than the diffusion bonding temperature of diffusion bonding in the first diffusion bonding site.

The gap layer may be removed by pressing, change of phase or a substance etc.

It is noted that in this document, stack means not only arrange along vertical direction but also arrange side by side (obliquely) along horizontal direction.

DETAILED DESCRIPTION OF PREFERRED EMBODIMENTS

Figure 1:
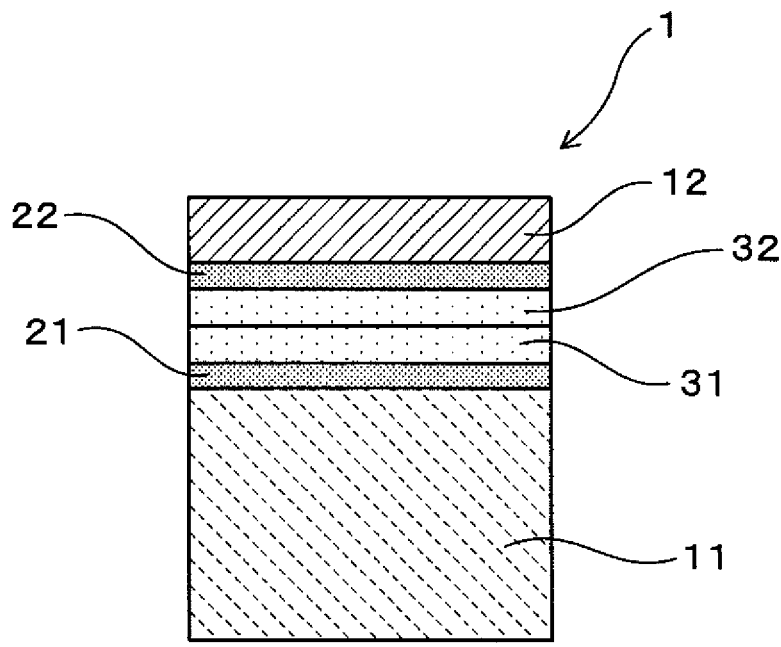
FIG. 1 is a cross-sectional view showing a bonded body according to a first example.

In an embodiment of the method for producing a bonded body, in a diffusion bonding step, a gap layer suppresses thermal conduction between a bond portion of a ceramic body and a first intermediate layer and a bond portion of a metal body and a second intermediate layer. Accordingly, the gap layer just has to be configured to suppress thermal conduction between both of the bond portions such that the diffusion bonding of one of the bond portions does not influence the diffusion bonding of the other bond portion.

In addition, in the diffusion bonding step, the gap layer removes oxidized films formed on gap side surfaces, i.e. the surfaces adjacent to the gap layer, of the first and second intermediate layers. That is, the gap layer contains a component that remove by chemical reduction the oxidized films formed on the surfaces of the first and second intermediate layers, thereby activating the surfaces. Materials for such gap layer include, for example, a fluoride flux, a basic flux, an oxide flux and a fluoride-basic oxide flux (Composition example: CaO, MgO, $CaF_2$, MnO, $SiO_2$ and $CaF_2$) containing a fluoride as a compounding agent.

In the diffusion bonding step, a first assembly of the ceramic body and the first intermediate layer and a second assembly of the metal body and the second intermediate layer are heated at different temperature respectively to perform each diffusion bonding. The methods for heating both bond portions at the respective temperature and performing each diffusion bonding include electrical resistance heating method, induction heating method, laser heating method and arc plasma heating method etc.

In the resistance heating method, heat is generated by the resistance of the interface between the ceramic body and the first intermediate layer, and the resistance of the interface between the metal body and the second intermediate layer, thereby heating both bond portions at different temperature respectively.

In the induction heating method, each coil is disposed at a respective portion to be heated, respective electrical current or frequency is applied to each coil, thereby both bond portions can be heated at different temperature respectively. Alternatively, the bond portion between the metal body and the second intermediate layer may be heated by induction heating, and the bond portion between the ceramic body and the first intermediate layer may be heated by the radiation heat of induction heating.

In the laser heating method, irradiating each interface of the bond portions with lasers with different powers can heat both bond portions at different temperature respectively.

In the arc plasma heating, using temperature distribution, depending on distance (for example, distance from plasma core), in plasma generated site can heat both bond portions at different temperature respectively.

In a gap layer removal step, at least a part of the gap layer is removed from between the first and second intermediate layer. At this time, the gap layer just have to be removed as much as giving no influence on bonding between the first and second intermediate layers, that is, as the first and second intermediate layers can be bonded adequately.

The gap layer is 0.1 W/(m·K) or less in thermal conductivity.

Such a gap layer, in the diffusion bonding step, can prevent heat conduction between the bond portions sufficiently.

The gap layer may contain a flux for stainless steel.

Such a gap layer, in the diffusion bonding step, can prevent heat conduction between the bond portions sufficiently. Further, this can remove by chemical reduction oxidized films on the gap layer side surfaces of the first and second intermediate layers sufficiently.

The flux for stainless steel used for the gap layer include, for example, a flux containing fluoride as a compounding agent, a flux containing chloride or boride, etc.

The gap layer only has to have a thickness which can prevent heat conduction between the bond portions sufficiently.

In addition, considering removing the gap layer from between the first and second intermediate layers, the thickness may be set, for example, at 1 mm or less.

Further, at least one of the first and second intermediate layers has a projection portion on the gap layer side surface thereof, in the step of removing the gap layer, the first and second intermediate layers with the gap layer therebetween are compressed in the arranging direction, thereby the projection portion plastically flows to force the gap layer out from between the first and second intermediate layers.

In this case, in the gap layer removal step, the gap layer can be removed from between the first and second intermediate layer easily and smoothly. This further improves the efficiency of bonding process.

As a ceramic material forming the ceramic body, for example, non-oxide ceramic materials such SiC, Si—SiC and $Si_3N_4$, and oxide ceramic materials such as alumina may be used.

As a metal material forming the metal body, for example, stainless steel, Inconel (trade mark) which is a nickel alloy may be used.

As a material forming the first intermediate material, a material whose linear expansion coefficient is between those of the ceramic body and the metal body, and capable of diffusing into a ceramic material forming the ceramic body can be used. For example, if a ceramic material forming the ceramic body is SiC, Cr having good diffusion ability to SiC may be used.

As a material forming the second intermediate material, a material whose linear expansion coefficient is between those of the ceramic body and the metal body, and capable of diffusing into a metal material forming the metal body can be used. For example, if a metal material forming the metal body is Inconel (trade mark), Cr having good diffusion ability to Inconel may be used.

It is preferred that the first and second intermediate layers are made from the same material. In this case, in the intermediate layer bonding step, the first and second intermediate layers can be bonded to each other easily and strongly.

The first and second intermediate layer may be formed from, for example, a plate material, powder material, etc. The first and second intermediate layer may be formed on the ceramic body or the metal body by sputtering etc.

FIRST EXAMPLE

An example according to the above-described method for producing a bonded body is now described, referring to the drawings.

As shown in FIG. 1, the bonded body to be produced in this example has a ceramic body 11 made from a ceramic material, and a metal body 12 made from a metal material. The ceramic body 11 is made from SiC. The metal body 12 is made from Inconel (trade mark), which is a nickel alloy.

As shown in FIG. 1, a first intermediate layer 31 and a second intermediate layer 32 are provided between the ceramic body 11 and the metal body 11. The first intermediate layer 31 is disposed to the ceramic body 11, and the second intermediate layer 32 is disposed to the metal body 12. Both of the first and second intermediate layers 31, 32 are made from Cr. The first and second intermediate layers 31, 32 form metallic bonds with each other. The thermal expansion coefficients of the first and second intermediate layers 31, 32 are between the thermal expansion coefficients of the ceramic body 11 and the thermal expansion coefficient of the metal body 12.

The ceramic body 11 and the first intermediate layer 31 are diffusion-bonded. Specifically, a first diffusion layer 21 is formed between the ceramic body 11 and the first intermediate layer 31. The ceramic body 11 and the first intermediate layer 31 are bonded through the first diffusion layer 21. In the first diffusion layer 21, from the first intermediate layer 31 toward the ceramic body 11, the percentage of component of the ceramic body 11 gradually increases (i.e., the percentage of component of the first intermediate layer 31 gradually decreases). The thickness of the first diffusion layer 21 is about 30 µm.

The metal body 12 and the second intermediate layer 32 are diffusion-bonded. Specifically, a second diffusion layer 22 is formed between the metal body 12 and the second intermediate layer 32. The metal body 12 and the second intermediate layer 32 are bonded through the second diffusion layer 22. In the second diffusion layer 22, from the second intermediate layer 32 toward the metal body 12, the percentage of component of the metal body 12 gradually increases (i.e., the percentage of component of the second intermediate layer 32 gradually decreases). The thickness of the second diffusion layer 22 is about 30 µm.

The bonded body 1 has an inclination structure where the ceramic body 11, the first diffusion layer 21, the first and second intermediate layers 31, 32, the second diffusion layer 22 and the metal body 12, in this order, escalate in thermal expansion coefficient. Specifically, the ceramic body 11 is $5 \times 10^{-6}/° C.$, the first diffusion layer 21 is $7 \times 10^{-6}/° C.$, the first and second intermediate layers 31, 32 are $8 \times 10^{-6}/° C.$, the second diffusion layer 22 is $10 \times 10^{-6}/° C.$, and the metal body 12 is $12 \times 10^{-6}/° C.$ in thermal expansion coefficient.

Next, the method for producing the bonded body 1 of this example is described.

As shown in FIGS. 2 to 5, the method for producing the bonded body 1 of this example has an arranging step, a diffusion bonding step, a gap layer removal step, and intermediate layer bonding step. In the arranging step, the gap layer 4 is arranged between the ceramic body 11 and the metal body 12, and the first and second intermediate layers 31, 32 are arranged between the ceramic body 11 and the gap layer 4 to and between the metal body 12 and the gap layer 4 respectively, the linear expansion coefficients of the first and second intermediate layers 31, 32 being between those of the ceramic body 11 and the metal body 12. In the diffusion bonding step, the diffusion bonding between the ceramic body 11 and the first intermediate layer 31 is performed in conjunction with the diffusion bonding between the metal body 12 and the second intermediate layer 32. In the gap layer removal step, at least a part of the gap layer 4 is removed from between the first and second intermediate layers 31, 32. In the intermediate layer bonding step, the first and second intermediate layers are bonded to each other.

In the diffusion bonding step, using the gap layer 4 prevents the thermal conduction between the bond portion (first bond portion) of the ceramic body 11 and the first intermediate layer 31 and the bond portion (second bond portion) of the metal body 12 and the second intermediate layer 32, and allows oxidized films to be removed, the oxidized films being formed on the gap layer side surfaces 311, 312 of the first and second intermediate layers 31, 32.

This is described in detail, below.

Figure 2:
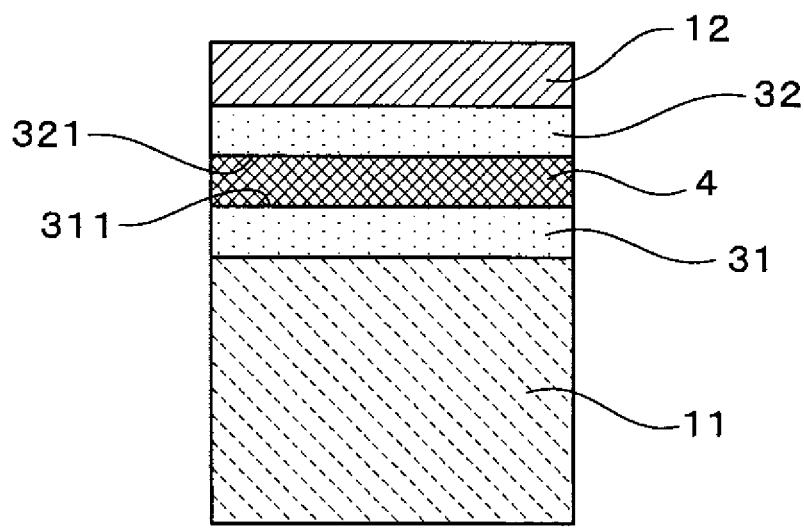
FIG. 2 is an explanatory diagram showing an arranging step according to the first example.

At first, as shown in FIG. 2, the gap layer 4 (about 1 mm in thickness) is arranged between the ceramic body 11 and the metal body 12, the first intermediate layer 31 (about 0.5 mm in thickness) is arranged between the ceramic body 11 and the gap layer 4, and the second intermediate layer 32 (about 0.5 mm in thickness) is arranged between the metal body 12 and the gap layer 4 (arranging step). Specifically, the ceramic body 11, the first intermediate layer 31, the gap layer 4, the second intermediate layer 32, and the metal body 12 are stacked in this order.

In this example, the gap layer 4 consists of a flux for stainless steel. As the flux for stainless steel, a fluoride flux containing fluoride is used.

Here, the gap layer 4 has a function of preventing the thermal conduction between the first and second bond portions in the diffusion bonding step described below. The thermal conductivity of the gap layer 4 is 0.1 W/(m·K) or less. Specifically, the thermal conductivity of the gap layer 4 of this example is 0.1 W/(m·K).

In addition, the gap layer 4 has another function of removing the oxidized films formed on the gap layer side surfaces 311, 321 of the first and second layers 31, 32 in the diffusion bonding step described below. The gap layer 4 contains a component, specifically flux, which remove by chemical reduction the oxidized films formed on the surfaces 311, 321 of the first and second intermediate layers 31, 32, thereby activating the surfaces 311, 321.

Figure 3:
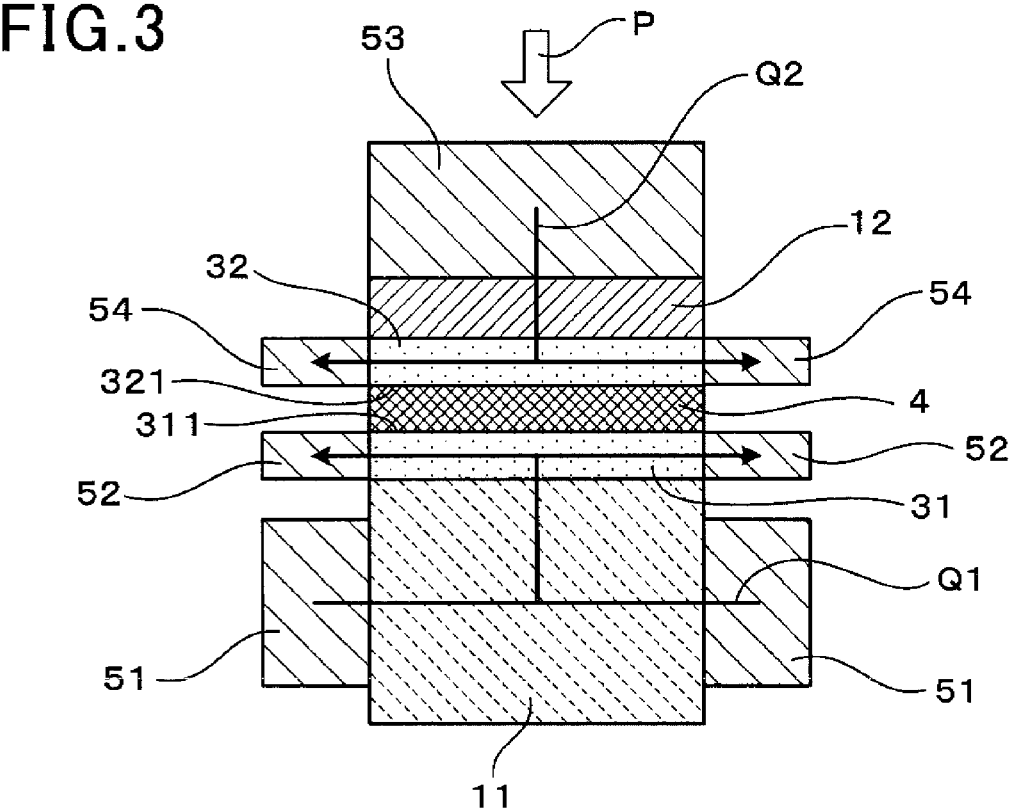
FIG. 3 is an explanatory diagram showing a diffusion bonding step according to the first example.

Thereafter, as shown in FIG. 3, diffusion bonding of the ceramic body 11 and the first intermediate layer 31 is performed at the same time as diffusion bonding of the metal body 12 and the second intermediate layer 32 (diffusion bonding step).

Specifically, in a portion (described as ceramic side portion) of the stacked body, which is a piece assembly adjacent to the gap layer 4 and including the ceramic body 11, a pair of (ring) electrodes 51, 52 are attached to the ceramic body 11 and the first intermediate layer 31 respectively. Further, in another portion (described as metal side portion) of the stacked body, which is a piece assembly adjacent to the gap layer 4 and including the metal body 12, a pair of electrodes 53, 54 are attached to the metal body 12 and the second intermediate layer 32 respectively.

Thereafter, in a state where force P in the stacking direction (corresponding to an arranging direction) is applied to the stacked body, in the ceramic side portion, applying electrical current Q1 to the pair of electrodes 51, 52 through the ceramic body 11 and the first intermediate layer 31 causes their resistance to generate heat, thereby heating the interface between the ceramic body 11 and the first intermediate layer 31 at about 900° C. This allows the first diffusion layer 21 having a thickness of about 30 µm between the ceramic body 11 and the first intermediate layer 31 to be formed, and the ceramic body 11 and the first intermediate layer 31 are bonded to each other through the first diffusion layer 21.

In parallel with this, in the metal side portion, applying electrical current Q2 to the pair of electrodes 53, 54 through the metal body 12 and the second intermediate layer 32 causes their electrical resistance to generate heat, thereby heating the interface between the metal body 12 and the second intermediate layer 32 at about 1200° C. This allows the second diffusion layer 22 having a thickness of about 30 μm between the metal body 12 and the second intermediate layer 32 to be formed, and the metal 12 and the second intermediate layer 32 are bonded to each other through the second diffusion layer 22.

In the diffusion bonding step, the gap layer 4 between the ceramic side portion and the metal side portion prevents the heat conduction between the first bond portion and the second bond portion. In addition, the gap layer 4 removes the oxidized films formed on the gap side surfaces 311, 321 of the first and second intermediate layers 31, 32, thereby activating the surfaces 311, 321.

Figure 4:
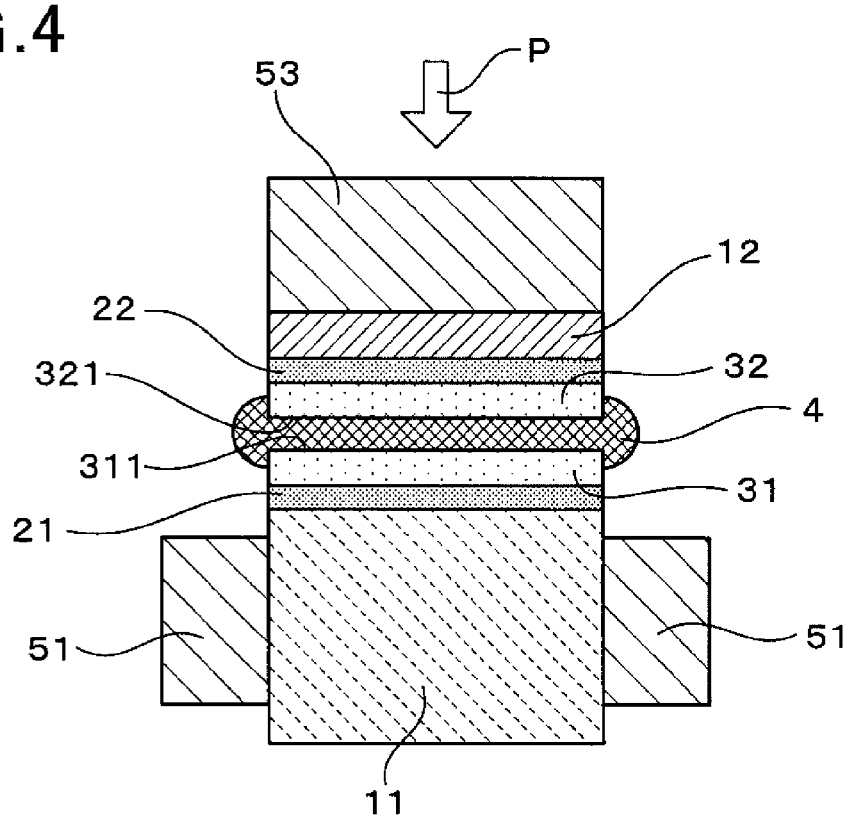
FIG. 4 is an explanatory diagram showing a gap removal step according to the first example.

Next, as shown in FIG. 4, the gap layer 4 is removed from between the first and second intermediate layers 31, 32 (gap layer removal step). Specifically, after detaching the electrode 52 attached to the first intermediate layer 31 and the electrode 54 attached to the second intermediate layer 32, force P in the stacking direction is applied to whole of the stacked body to compress it, thereby the gap layer 4 is pushed out from between the first and second intermediate layers 31, 32. The compressed gap layer 4 sublimates from solid state. All of the gap layer 4 need not be removed, if the first and second intermediate layers 31 and 32 are bonded to each other adequately in the following intermediate layer bonding step.

Figure 5:
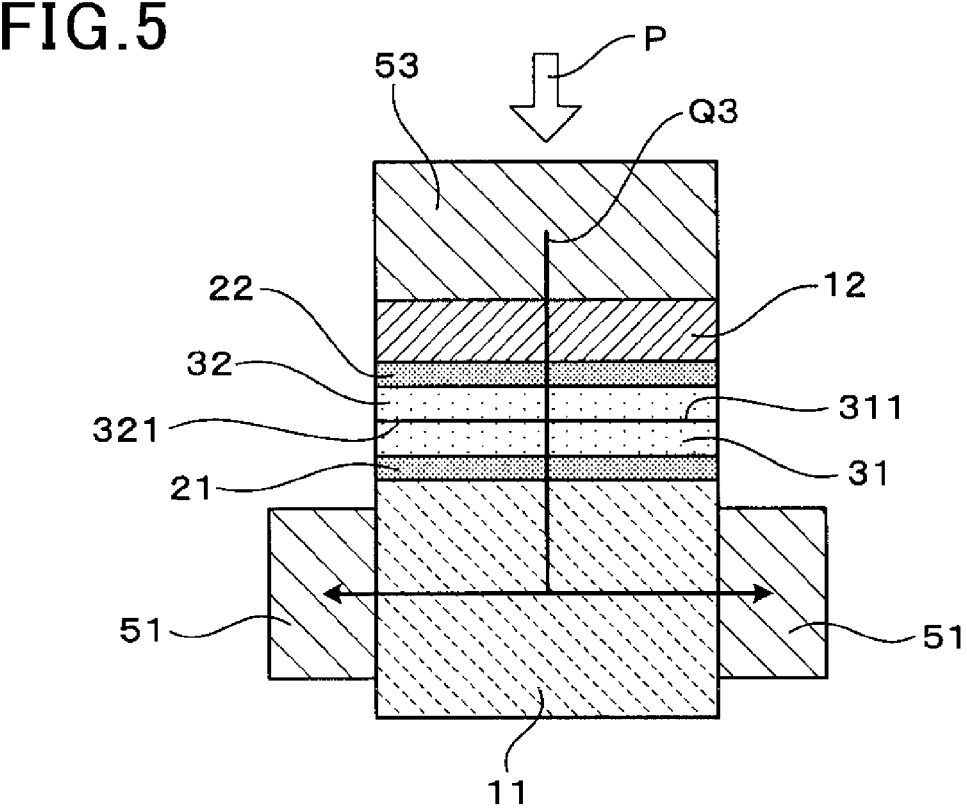
FIG. 5 is an explanatory diagram showing an intermediate layer bonding step according to the first example.

After that, as shown in FIG. 5, the first and second intermediate layers 31 and 32 are bonded to each other (intermediate layer bonding step). Specifically, the surfaces 311, 312 of the first and second intermediate layers 31, 32 are contacted with each other. Thereafter, in a state where force P in the stacking direction is applied to the stacked body, applying electrical current Q3 between the electrodes 51 and 53 through the metal body 12, the second intermediate layer 32, the first intermediate layer 31 and the ceramic body 11 causes their resistance to generate heat, thereby heating the interface between the first and second intermediate layers 31, 32 at about 750° C. This result in the bonded first and second intermediate layers 31, 32 forming metallic bonds with each other. It is noted that strength of the force P in the diffusion bonding step, the gap layer removal step and the intermediate layer bonding step need not be the same.

Thus, the bonded body 1 shown in FIG. 1 is obtained.

The functions and effects according to this example are described hereinafter.

In the method for producing the bonded body of this example, in the arranging step, the gap layer 4 is arranged between the ceramic body 11 and the metal body 12, the first intermediate layer 31 is arranged between the ceramic body 11 and the gap layer 4, and the second intermediate layer 32 is arranged between the metal body 12 and the gap layer 4. In the diffusion bonding step, diffusion bonding of the ceramic body 11 and the first intermediate layer 31 is performed at the same time as diffusion bonding of the metal body 12 and the second intermediate layer 32. At this time, the gap layer 4 prevents the heat conduction between the first and the second bond portion.

Accordingly, if heating temperatures (diffusion bonding temperature) in diffusion bonding at both bond portions are different, each bond portion can be heated at a respective desired temperature, and diffusion bonding at both bond portions can be performed at the same time. Therefore, in the diffusion bonding step, diffusion bonding between the ceramic body 11 and the first intermediate layer 31 and diffusion bonding between the metal body 12 and the second intermediate layer 32 can be performed at the same time and accurately, this increases efficiency of bonding process. In addition, this can reduce man-hours and costs etc.

Further, in the diffusion bonding step, the gap layer 4 removes the oxidized films formed on the gap layer side surfaces 311, 321 of the first and second intermediate layers 31, 32. That is, the gap layer 4 removes by chemical reduction the oxidized films formed on the gap layer side surfaces 311, 321 of the first and second intermediate layers 31, 32 adjacent to the gap layer 4. This allows the surfaces 311, 321 of the first and second intermediate layers 31, 32 to be activated. Accordingly, in the intermediate layer bonding step, the first and second intermediate layers 31, 32 can be bonded to each other at lower temperature, accurately and strongly.

In addition, the bonded body 1 produced as above has an inclination structure where the ceramic body 11, the first and second intermediate layers 31, 32, and the metal body 12, in this order, escalate in thermal expansion coefficient, and each piece is bonded to the adjacent piece thereto through diffusion bonding accurately and strongly. Therefore, thermal stress occurring at the point of use under a high temperature environment due to the difference between the thermal expansion coefficients is reduced significantly. Further, bonding reliability to the thermal stress can be secured sufficiently.

In this example, the gap layer 4 is 0.1 W/(m·K) or less in thermal conductivity. Therefore, in the diffusion bonding step, the gap layer 4 can prevent the heat conduction between the diffusion bonding portion of the ceramic body 11 and the first intermediate layer 31 and the diffusion bonding portion of the metal body 12 and the second intermediate layer 32 adequately.

The gap layer 4 is made from flux for stainless steel. Accordingly, in the diffusion bonding step, the gap layer 4 can prevent the heat conduction between the diffusion bonding portion of the ceramic body 11 and the first intermediate layer 31 and the diffusion bonding portion of the metal body 12 and the second intermediate layer 32 adequately. In addition, the gap layer 4 can remove by reduction the oxidized films formed on the gap side surfaces 311, 321 of the first and second intermediate layers 31, 32 significantly.

As described above, according to this example, there can be provided a method for producing the bonded body 1 which can increase efficiency of the bonding process of the ceramic body 11 and the metal body 12, and can secure bonding reliability sufficiently.

Figure 6:
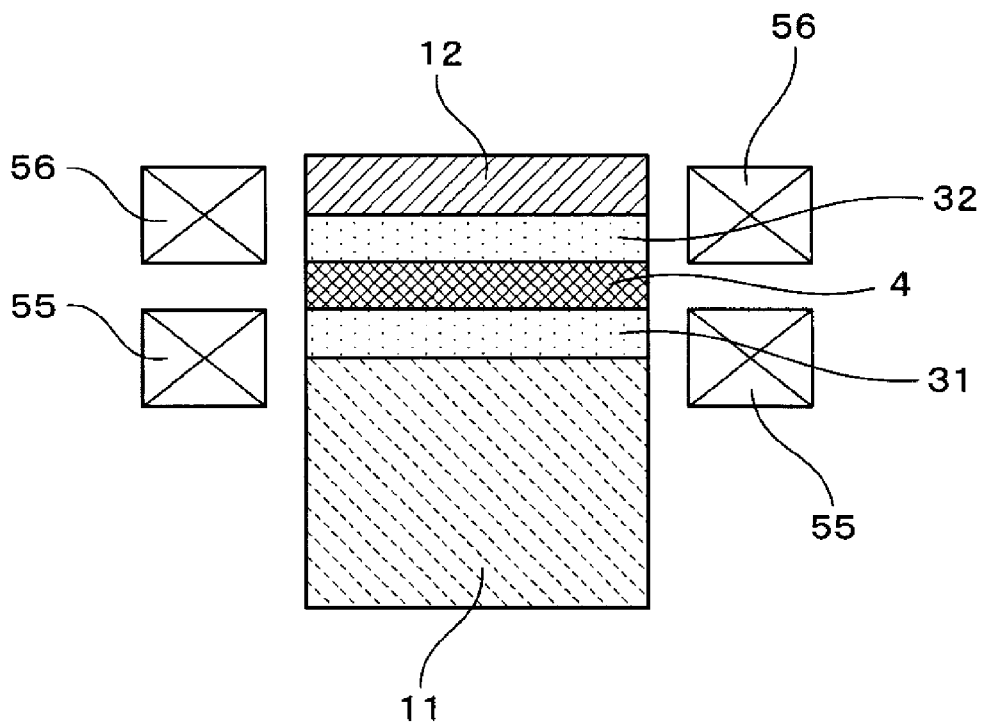
FIG. 6 is an explanatory diagram showing another example of the diffusion bonding step according to the first example.

Although, in this example, in the diffusion bonding step, the resistance heating method is applied as shown in FIG. 3, alternatively, for example, the induction heating method using a pair of coils 55, 56 may be applied as shown in FIG. 6. Other methods using laser or arc plasma may be applied.

SECOND EXAMPLE

Figure 7:
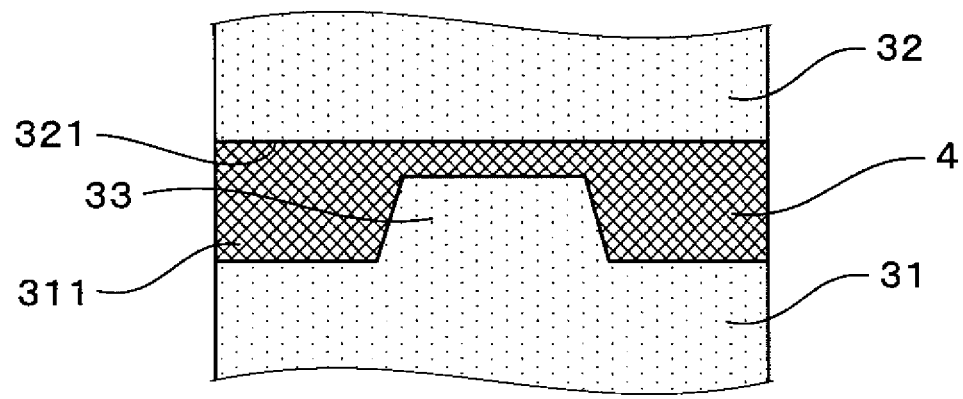
FIG. 7 is a cross-sectional view showing a projection portion of a first intermediate layer according to a second example.
Figure 8:
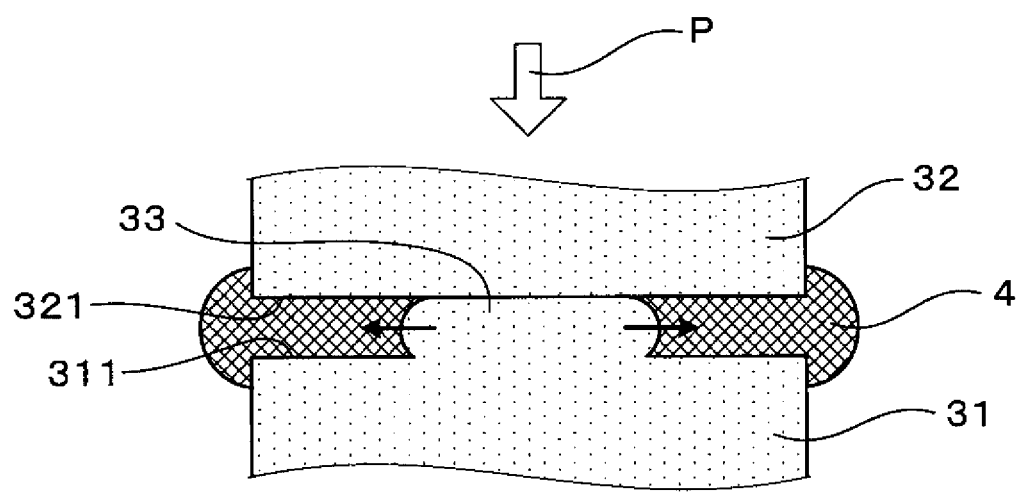
FIG. 8 is a an explanatory diagram showing the gap removal step according to the second example.

In a second example, as shown in FIGS. 7 and 8, the gap layer removal step is performed using the first intermediate layer 31 having a modified structure.

As shown in FIG. 7, a projection portion 33 projecting toward the second intermediate layer 32 is provided on the gap layer side surface 311 of the first intermediate layer 31, specifically at the central part of the surface 311. The gap layer 4 is also disposed at the outer periphery of the projection portion 33 of the first intermediate layer 31.

In the gap layer removal step, as shown in FIG. 8, in a state where the gap layer 4 is intervening, force P in the stacking direction is applied to compress the first and second intermediate layers 31, 32. The projection portion 33 of the first intermediate layer 31 plastically deforms to flow (or plastically flow) outward along the surfaces 311, 321 of the first and second intermediate layers 31, 32, this flow forces the gap layer 4 out, thereby removing the gap layer 4 from between the first and second intermediate layers 31, 32.

Other points are basically the same as the first example, the same reference numeral are used for the same configurations, and the descriptions thereof are omitted.

Next, the functions and effects according to this example are described.

According to this example, in the gap layer removal step, the gap layer 4 can be removed from between the first and second intermediate layers 31, 32 easily and smoothly. Accordingly, higher efficiency of the bonding process can be realized.

Other basic functions and effects are the same as the first example.

THIRD EXAMPLE

A third example is an example where the bonded body 1 is used in an electrically heated catalytic converter 8, as shown in FIGS. 9 to 12.

Figure 9:
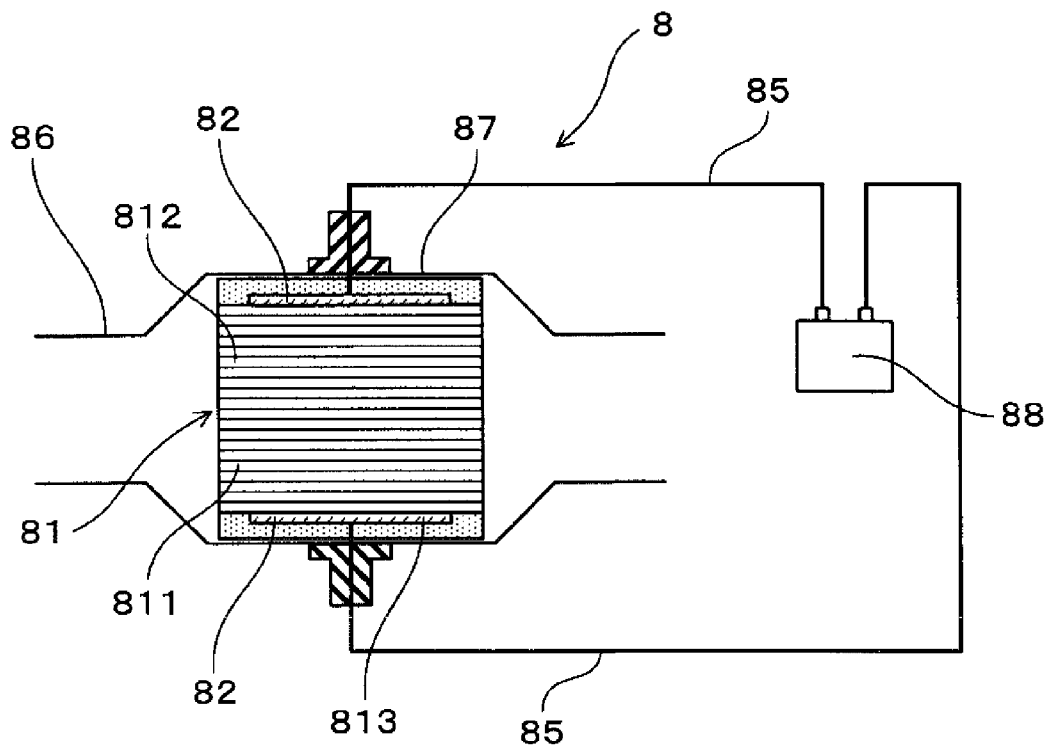
FIG. 9 is a cross-sectional view an electrically heated catalytic converter according to a third example.

As shown in FIG. 9, the catalytic converter 8 has a cylindrical honeycomb structural body 81 made from Si—SiC. The honeycomb structural body 81 is inserted into a cylindrical case 87 connected to an exhaust pipe 86.

Figure 10:
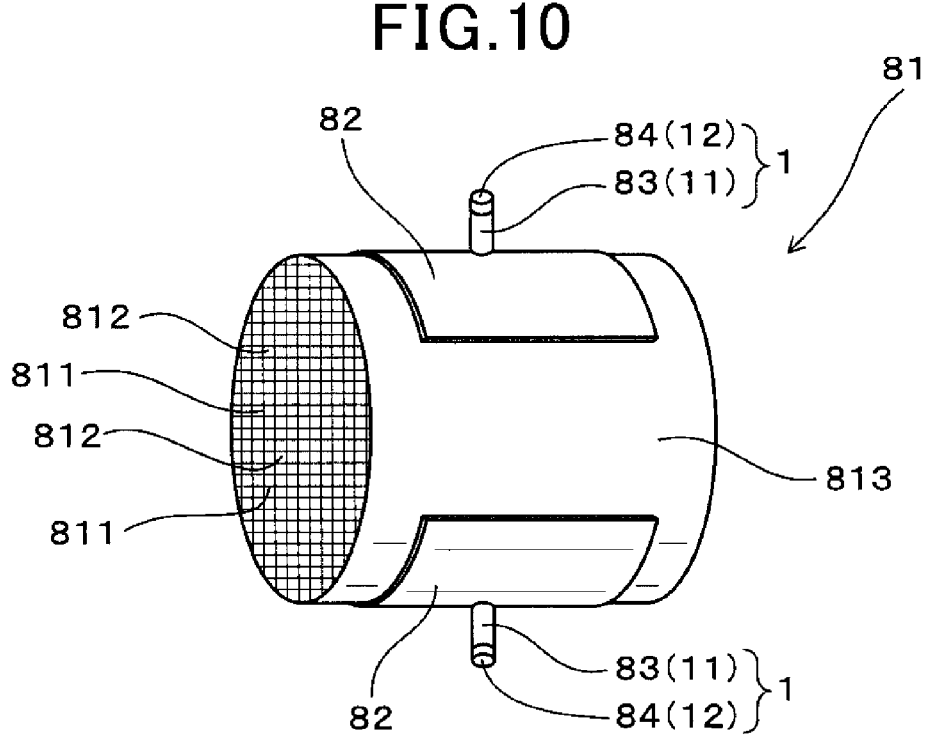
FIG. 10 is a perspective view showing a honeycomb structural body according to the third example.
Figure 11:
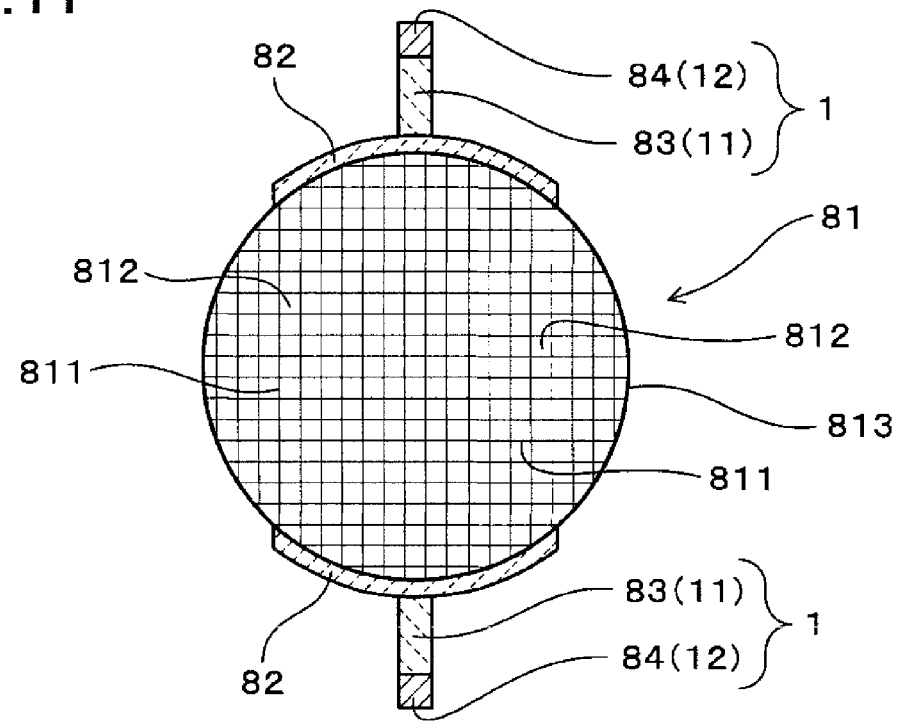
FIG. 11 is a cross-sectional view showing a cross section of the honeycomb structural body according to the third example, the cross section being perpendicular to an axis of the honeycomb structural body.
Figure 12:
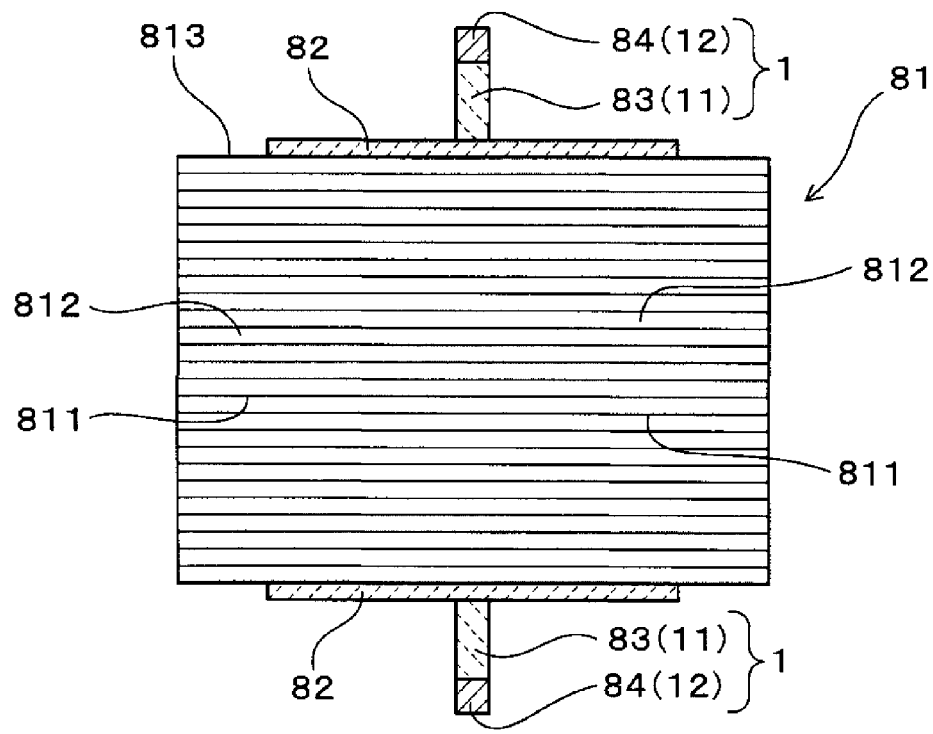
FIG. 12 is a cross-sectional view showing a cross section of the honeycomb structural body according to the third example, the cross section being along the axis of the honeycomb structural body.

As shown in FIGS. 10 to 12, the honeycomb structural body has a cylindrical outer periphery wall 813 and a porous core member 811 inserted in the cylindrical outer periphery wall 811. The core member 811 divides the inner space of the outer periphery wall 813 to form multiple cells 812 which are quadrangular prism-shaped spaces extending along the axial direction of the outer periphery wall 813. Three-way catalysts having cleaning ability of exhaust gas, such as Pt, Pd and Rh, can be held on the core member 811.

As shown in FIGS. 10 to 12, a pair of electrodes 82 made from Si—SiC are attached to the outer periphery wall 813 of the honeycomb structural body 81 such that the electrodes 82 sandwich the honeycomb structural body 81. Each electrode terminals 83 made from Si—SiC is attached to a respective electrode 82. Each metal terminal 84 made from Inconel (trade mark) which is a nickel alloy is attached to a respective end of the electrode terminal 83.

In this example, the electrode terminal 83 corresponds to the ceramic body 11, the metal terminal 84 corresponds to the metal body 12, and the bonded body thereof corresponds to the bonded body 1. The bonded body 1 is made using the same method as the first example. The configuration of the bonded body 1 is the same as the first example. It is noted that, in FIGS. 10 to 12, the illustrations of the diffusion layer 21, the first intermediate layer 31, the second intermediate layer 32 and the second diffusion layer 22 between the ceramic body 11 (the electrode terminal 83) and the metal body 12 (the metal terminal 84) is omitted.

As shown in FIG. 9, the catalytic converter 8 has a pair of leads 85 connected to the metal terminals 84 (not shown in FIG. 9) of the honeycomb structural body 81 and a power source 88 to which the leads is connected. The catalytic converter 8 applies voltage between the electrodes 82, thereby allowing the honeycomb structural body 81 to generate heat. The heat increases cleaning ability (ability for reducing toxic pollutants in exhaust gas) of the catalyst held in the honeycomb structural body 81 to clean exhaust gas.

The above-described catalytic converter 8 is used under a high temperature environment at 600° C. or more. Accordingly, securing reliability of bonding between the electrode terminal 83 which is the ceramic body 11 and the metal terminal 84 which is the metal body 12 sufficiently is demanded.

Therefore, it is preferred that the bonded body 1 produced according to the producing method of the first example is used for such a portion.

Though the invention has been described with respect to the specific preferred examples, many variations and modifications will become apparent to those skilled in the art upon reading the present application. It is therefore the intention that the claims be interpreted as broadly as possible in view of the prior art to include all such variations and modifications.

What is claimed is:

1. A method for producing a bonded body of a ceramic body made from a ceramic material and a metal body made from a metal material, comprising the steps:
    arranging the ceramic body, the metal body, a gap layer having a property preventing oxidation, a first intermediate layer and a second intermediate layer such that, in an arranging direction the gap layer is between the ceramic body and the metal body, the first inter mediate layer is between the ceramic body and the gap layer, and the second intermediate layer is between the gap layer and the metal body, linear expansion coefficients of the first and second intermediate layers being between those of the ceramic body and the metal body;
    performing diffusion bonding between the ceramic body and the first intermediate layer in parallel with diffusion bonding between the metal body and the second intermediate layer;
    removing at least a part of the gap layer from between the first and second intermediate layers; and
    bonding the first and second intermediate layers to each other,
    wherein
    in the step of performing the diffusion bonding, the gap layer prevents formation of an oxidized film on gap layer side surfaces of the first and second intermediate layers, and heat conduction between the diffusion bonding portion of the ceramic body and the first intermediate layer and the diffusion bonding portion of the metal body and the second intermediate layer.

2. The method according to claim 1, wherein the gap layer is 0.1 W/(m·K) or less in thermal conductivity.

3. The method according to claim 1, wherein
    in the step of removing the gap layer, the gap layer is removed as the first and second intermediate layers approach each other along the arranging direction.

4. The method according to claim 3, wherein
    in the step of removing the gap layer, the first and second intermediate layers with the gap layer therebetween are compressed in the arranging direction, thereby the gap layer is forced out from between the first and second intermediate layers.

5. The method according to claim 1, wherein the gap layer is made from flux.

6. The method according to claim 1, wherein:
    at least one of the first and second intermediate layers has a projection portion on the gap layer side surface thereof;
    in the step of removing the gap layer, the first and second intermediate layers with the gap layer therebetween are compressed in the arranging direction, thereby the projection portion plastically flows to force the gap layer out from between the first and second intermediate layers.

* * * * *